United States Patent [19]

Mathieu et al.

[11] Patent Number: 5,761,224

[45] Date of Patent: Jun. 2, 1998

[54] MINIATURE STIMULATED RAMAN SHIFTING CELL

[75] Inventors: Pierre J. P. R. Mathieu, Cap-Rouge; Georges R. Fournier, Lac Beauport; Silvester Wong, Ste-Foy; Vincent Larochelle, Loretteville; Paul Pace, Sillery, all of Canada

[73] Assignee: Her Majesty the Queen as represented by the Minister of National Defence of Her Majesty's Canadian Government, Ottawa, Canada

[21] Appl. No.: 625,848

[22] Filed: Apr. 4, 1996

[51] Int. Cl.⁶ ........................................ H01S 3/30
[52] U.S. Cl. ........................ 372/3; 372/92; 372/39; 372/98
[58] Field of Search ........................ 372/3, 92, 98, 372/39

[56] References Cited

U.S. PATENT DOCUMENTS 4,868,833  9/1989  Stultz et al. ........................ 372/3
4,933,943  6/1990  Narhi et al. ........................ 372/3
5,265,106  11/1993  Garcia et al. ........................ 372/3
5,566,195  10/1996  Heppner et al. ........................ 372/3

*Primary Examiner*—Leon Scott, Jr.
*Attorney, Agent, or Firm*—Larson and Taylor

[57] ABSTRACT

A Raman cell for Raman shifting of a laser pump beam, to an output beam of a different wavelength, the cell containing a gaseous Raman medium at a pressure of 100-1000 PSIG. An input window for a pump beam is located at one end of the cell and an output window for a Raman shifted wavelength output beam is located at the cells opposite end. The output window is formed as a plane mirror having an inner face coated with dielectric thin films which provide a high reflectivity for the wavelength of the pump beam and a partial reflectivity at the cell's Raman shifted wavelength. The input window includes at least one lens that forms a converging lens for the pump beam which has a focal length in the Raman medium of about ½ of the cell's inner length to substantially focus the pump beam at the center of the cell after it is reflected back by the inner face of the plane mirror.

17 Claims, 1 Drawing Sheet

5,761,224

MINIATURE STIMULATED RAMAN SHIFTING CELL

FIELD OF THE INVENTION

The present invention is directed to stimulated Raman shifting cells and in particular to a Raman cell with a geometric design that allows a reduction in length of the cell for a given focal length of its input lens while permitting operation at energy levels similar to those for a normal full length Raman cell, which levels provides for efficient conversion in the cell of a laser pump beam to the frequency of the output beam.

BACKGROUND OF THE INVENTION

Many applications where lasers may be used require laser sources of a wavelength that is eye safe. These applications include ones such as range finding, communications, cloud mapping lidars, etc. Generally, readily available solid state laser sources operate at wavelengths around 1 µm, such as a $Nd^{+3}$-YAG laser at a wavelength of 1.06 µm. These wavelengths create eye hazards at any useful operating power and this limits the use of those solid state laser sources in a number of applications. However, laser beams from those sources can be shifted in wavelength to an eye safe beam in a Raman cell by Simulated Raman Scattering (SRS) as described in Canadian Patent 2,074,125 by S. T. Whittley which issued on Jul. 17, 1992. The 1.06 µm radiation beam from a Q-switched Nd-YAG laser can be shifted, for instance, to an eye safe radiation beam at 1.54 µm by stimulated Raman scattering in a methane filled Raman cell.

Simulated Raman Scattering (SRS) can be achieved by passing a high intensity laser beam, i.e. a so-called pump beam, through a high pressure gas or liquid Raman medium in a Raman cell. In the cell, the Raman medium shifts the laser wavelength of the pump beam by an amount that is dependent on the type of material forming the Raman medium. This Raman conversion process forms an output beam of a different wavelength from that of the input pump beam. The optical gain of this system is a function of the intensity of the pump laser beam in the Raman cell. To ensure efficient Raman conversion requires the use of a high intensity pump beam in the Raman cell but undesirable effects such as optical breakdown, Brillouin back scattering or self-focusing can occur, which effects prevents an efficient conversion process.

The principal limitation of present pumping methods is that the Raman medium can suffer from what is known as "optical breakdown" when a high laser pump beam power intensity is used in the Raman cell. This "optical breakdown" in the SRS medium severely limits conversion efficiency and it has generally been necessary to have a Raman cell of more than 10 cm long in order to avoid such a breakdown in the SRS medium. That medium is usually methane ($CH_4$) but could be other Raman active gases such as $H_2$, $D_2$, $O_2$, $NH_3$, $SO_2$, etc. This "optical breakdown" results in the Raman gain going to zero and lasing or amplification stopping immediately once such a breakdown occurs.

In a methane Raman cell, for instance, "optical breakdown" may also cause decomposition of some of the molecules and consequently produces fine carbon particles. These carbon particles will greatly increase the likelihood of further occurrences of breakdowns since they serve as initiating sites for optical breakdown in the focal volume of the pump beam. Detrimental deposits of these carbon particles can also occur on the optical components (windows, mirrors or lenses) and reduce the reflection or transmission of those components. These deposits can eventually lead to complete failure of the Raman cell by triggering optical damages to the surfaces of those components.

The "optical breakdown" in Raman mediums of a Raman cell is closely related to the peak pump intensity at the focus of the input lens. Therefore, the Raman cell length has to scale as the square root of the pump pulse energy for a given pump pulse duration. This relation makes it very desirable to lengthen the cell in order to avoid optical breakdown but also very difficult to reduce the cell length. Generally, it has been necessary to have a cell length of more than 10 cm in order to avoid "optical breakdown" in the SRS medium. That "optical breakdown" severely limits the conversion efficiency and, since it has a stochastic nature, it can still occur with a low probability at much lower optical intensity then that of which there is a 50% occurrence probability.

Another limitation of present pumping methods for a methane Raman medium is that the Raman scattering competes with a process known as simulated Brillouin scattering (SBS) and this SBS interaction can backscatter some of the pump beam. When a narrow line-width pump laser beam is used, the onset of Brillouin backscattering can efficiently reflect the pump laser beam back to the source and prevent further Raman conversion. Precautions are often required in order to protect the laser pump source from damage due to this reflected radiation such as the use of expensive Faraday rotators. A further limitation in liquid Raman mediums is the self-focusing of the pump beam in the liquid. This phenomenon has prevented the use of many liquids for efficient Raman conversion since the self-focusing can seriously damage optical components and even break the windows of the cell containing the Raman liquid medium.

One method of reducing the occurrence of "optical breakdown", and other undesirable effects, in a Raman cell is to use cylindrical lenses since that optical breakdown is closely related to the peak pump beam intensity at the focus of the input lenses. This method is based on the idea that the focal volume of the input lens can be increased and the peak intensity of the pump beam decreased by using a lens or combination of lenses having a strong astigmatism. Another method for reducing the occurrence of "optical breakdown" in a Raman cell is to use an axicon with an input window for a laser pump beam at an input of the cell and another axicon at the other end of the cell containing an output window, the axicons forming an extended line focus along the cell's axis as described in U.S. Pat. No. 5,293,395 by G. R. Fournier which issued on Mar. 8, 1994.

The frequency shifting of the 1.06 µm output beam of $Nd^{+3}$ based lasers by a SRS conversion process in a high-pressure methane cell is a well-developed technique to produce eyesafe radiation for range finding and target designation systems. A 12 to 20 cm long Raman cell has generally been necessary in order to achieve reliable operation. This length severely constrains the size of the overall system and precludes attempts at retrofitting a Raman cell into existing $Nd^{+3}$ laser systems. Furthermore, in practice, the output beam produced by a Raman cell is transversally small (1–3 mm) and has a divergence of around 2–5 mrad. Therefore, most of the time, a beam expander telescope has to be used to reduce the divergence to match the 0.5–1 mrad field-of-view of receivers in range finding and target designation systems. In order to keep these systems reasonably small, it has been necessary to put the three basic elements (the pump laser, the SRS cell and beam expander telescope) side by side. Mirrors and/or prisms are then required to route the optical beams from one element to the next. This adds to a system's complexity since the alignment between the three basic elements must be precisely maintained over the full range of operating temperatures and despite shocks and vibrations which these systems are subjected to. A significantly shorter SRS cell could allow a much more simple "in line" arrangement for those three basic elements.

SUMMARY OF THE INVENTION

It is an object of the invention to provide a Raman cell for stimulated Raman shifting with a geometric design that allows a reduction in length of the cell for a given focal length of the input lens while permitting operation of the cell at pump beam energy levels similar to those for a full length normal Raman cell.

A Raman cell according to one preferred embodiment of the invention comprises an enclosed cell containing a gaseous Raman medium at a pressure of 100–1000 PSIG with an input window for a pump beam at one end of the cell and an output window for a Raman shifted wavelength at an opposite end of the cell, the output window being a plane mirror having an inner face coated with dielectric thin films that provide a high reflectivity at the pump beam's wavelength and a partial reflectivity at the cells Raman shifted wavelength, the input window containing at least one lens to form a converging lens for the pump beam, the converging lens having a focal length in the Raman medium of about ½ of the cell's inner length to substantially focus the pump beam at the center of the cell after being reflected by the inner face, the inner surface of the lens being coated with dielectric thin films to provide a coating that is highly transmissive to the pump beam but highly reflective at the Raman shifted wavelength. In a further preferred embodiment of the invention the inner surface of the lens has a radius of curvature equal to the inside length of the cell.

BRIEF DESCRIPTION OF THE DRAWINGS

The invention will now be described in more detail with reference to the accompanying drawings, in which.

DETAILED DESCRIPTION OF PREFERRED EMBODIMENTS OF THE INVENTION

Stimulated Raman scattering (SRS) can be achieved by passing a high intensity laser beam, i.e. a pump beam, through a high pressure gas or liquid medium in a Raman cell. The frequency shifting of a 1.06 μm output beam (pump beam) of $Nd^{+3}$ based lasers by a SRS conversion process in a high-pressure methane Raman cell is a well-developed technique to produce an eyesafe radiation output beam for range finding and target designation. A 12 to 20 cm long Raman cell has generally been necessary in order to achieve reliable operation. The Raman medium in these type of cells is usually methane ($CH_4$) but could be another Raman active gas such as $H_2$, $D_2$, $O_2$, $N_2$, $NH_3$, $SO_2$, etc.

Figure 1:
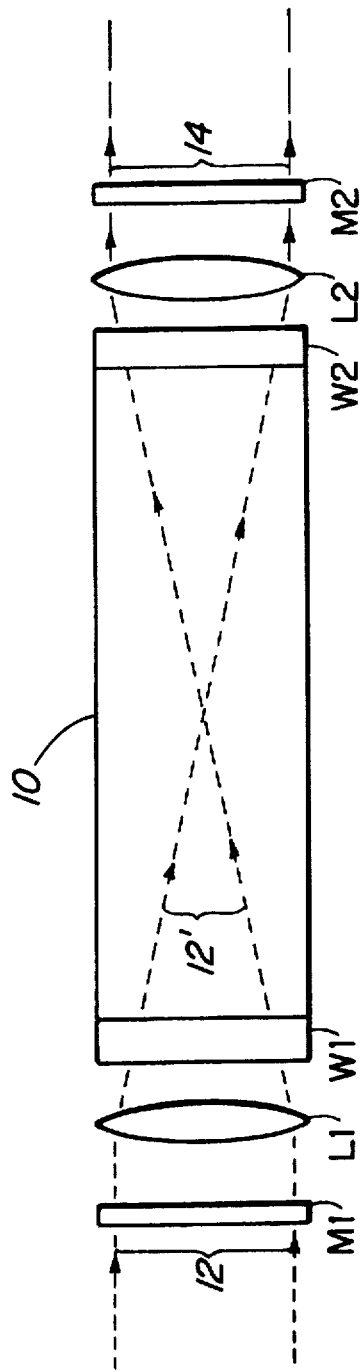
FIG. 1 illustrates, in cross-section, a typical prior art Raman cell design.

A typical arrangement for a Raman cell is illustrated in FIG. 1 in which a pump laser beam 12 is focused by lens L1 into a Raman cell 10 containing a high-pressure gas or a liquid. In the arrangement shown in FIG. 1, M1 is an optional dichroic mirror that is highly transmissive to the wavelength of the pump beam 12 and highly reflective to any radiation at the Raman wavelength of the output beam 14. This optional dichroic mirror M1 serves to reflect any generated backward Raman photons back to the Raman cell 10 so that these photons are also used to seed and augment the forward SRS process. L1 is an input focusing lens which focuses the pump beam 12 into the Raman cell 10 through an input window W1. Input window W1 and output window W2 are highly transmissive, high pressure windows that contain the high pressure Raman medium (methane gas for instance) in the Raman cell 10. The Raman output beam 14 exits the cell 10 through window W2 to an output collimating lens L2 that directs the output from the cell to an optional output coupler M2 which is partially reflective at the Raman wavelength (1.54 μm for a $CH_4$ gas pumped by 1.06 μm radiation) and is highly reflective at the pump beam wavelength (1.06 μm for a $Nd^{+3}$ based laser). The mirror M2 reflects pump beam radiation which is unconverted by the Raman process in the first pass through the cell back towards the cell where it once again passes through the Raman medium for further conversion.

The mirror M2 produces with mirror M1 an optical resonator at the Raman wavelength which couples the forward and backward SRS processes in the cell 10 and gives a positive feedback mechanism for a so-called Raman laser mode operation. This type of operation allows the SRS process to occur at a reduced pump beam intensity. The windows W1 and W2 are sealed to the cell body so as to constitute a tight vessel 10 which contains the high pressure SRS gaseous medium. That high pressure is generally about 1200 to 1400 PSIG. Preferably the lenses L1 and L2 as well as windows W1 and W2 are anti-reflective coated at either the pump beam or Raman wavelengths or at both wavelengths.

Figure 2:
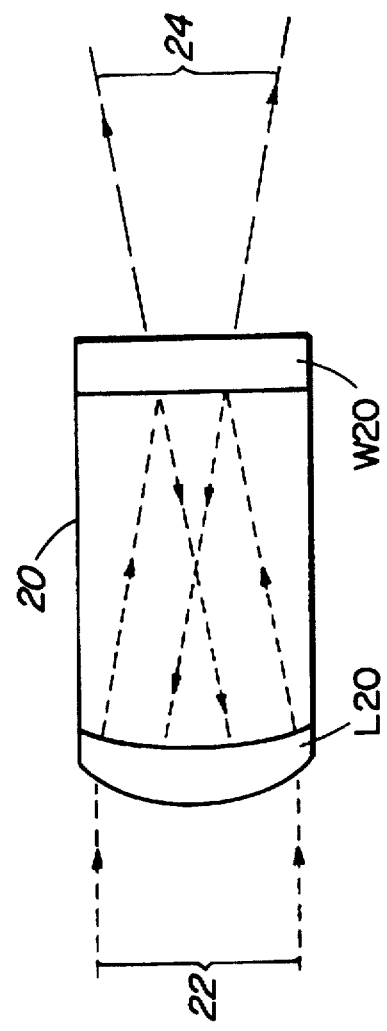
FIG. 2 illustrates, in cross-section, a folded pump geometry for a Raman cell according to one embodiment of the present invention.

The principal limitation of present pumping methods illustrated in FIG. 1 is the necessity to avoid "optical breakdown" in the SRS medium. That "optical breakdown" in a Raman cell is closely related to the peak pump beam intensity at the focus of the input lens and, as a consequence, the cell length has to scale as the square root of the pulse energy for a given pump pulse duration. This relationship generally requires a cell length of more than 10 cm to avoid "optical breakdown" while providing for efficient conversion of the pump beam to the Raman frequency of the output beam. A 12 to 20 cm long Raman cell is generally used to achieve reliable operation. In order to avoid the above mentioned limitations, a new folded pump geometry according to one embodiment of the present invention is shown in FIG. 2. This new geometry allows a reduction of the cell length by a factor of about 3 for a given focal length of the input lens. A pump laser beam 22 is directed into the Raman cell 20 from the left side, first passing through a converging lens L20 whose focal length in the high pressure SRS medium is ≈½ of the inside length of the cell. Upon reflection by window W20 at the other end of the cell, the beam will reach a focus at substantially the center of Raman cell 20. It should be noted that when designing the lens L20, the value of the index of refraction of the high pressure SRS medium used in cell 20 must be taken into account. This effect is particularly significant in a $CH_4$ gaseous SRS medium which is the one most frequently used to convert $Nd^{+3}$ YAG radiation at 1.06 μm to an eye safe radiation beam at 1.54 μm.

The outer surface of lens L20 in FIG. 2 should be anti-reflective coated for the wavelength of the input pump beam 22 with the inside surface of lens L20 being coated with dielectric thin films so that its transmission at the wavelength of the pump beam 22 is as high as possible. The inside dielectric thin films coating must also be highly reflective at the Raman shifted wavelength in order to reflect those wavelengths back into the cell 20. The output window W20 is coated on the inside to be highly reflective to the pump beam and partially reflective to the Raman shifted wavelength to allow some of the converted radiation to exit the cell as an output beam 24. The highly reflective inner surface of lens L20 and the partially reflective surface of window W20 at the Raman frequency form a laser cavity which operates close to the limits of stability for the cell to provide a high conversion efficiency. The reason for this high efficiency is that the marginal rays produced by the SRS process are able to efficiently extract the energy available at larger diameters, from the axis of the cell, if the resonator is close to its stability limit. There is a large latitude in choosing the radius of curvature of the inside surface of lens L20 but a good conversion efficiency is obtained when the combination of this highly reflecting inner surface and the output window W20 form a laser cavity that operate close to the limits of stability.

In the embodiment of the invention shown in FIG. 2, the laser cavity formed by the highly reflective inner face, at the Raman shifted wavelength, of the pump laser beam input focusing lens L20 and semi-transparent plane mirror of the inner face of the output window W20 at the opposite end of the cell 20 is hemi-concentric and therefore operates at the limits of stability. This is achieved by having the radius of curvature of the inside surface of lens L20 nearly equal to the inside length of the cell 20.

Both faces of the output window W20 shown in FIG. 2 are flat and the inside surface of window W20 is coated with dielectric thin films so that its reflectivity at the pump beam wavelength is high, preferably in the 95 to 100% range. This results in unconverted radiation from the pump beam being reflected back into the cell. However, the reflectivity of the inner surface of window W20 at the Raman shifted wavelength should be chosen in relation to the amount of gain produced by the pump beam in the Raman cell. At the lowest pump power, the SRS cell will only work in a Raman laser mode where several passes of the Raman radiation must occur in the cell before it reaches sizeable intensity. The mutual alignment of the inside surface of lens L20 and window W20 is critical for this mode of operation. The optimum reflectivity of the plane mirror on the inside surface of W20 at the Raman wavelength should be between 20 and 50% in this mode of operation. The Raman shifted output beam 24 is obtained from the window W20 since that plane mirror's inside surface is only partially reflective to the Raman shifted wavelength although it is highly reflective to wavelength of the pump beam. At somewhat higher pump power, the Raman gain is higher so that only a few passes through the cell will suffice to extract a large proportion of the available energy, a plane mirror with a reflectivity of 5-20% at the Raman wavelength could provide optimum performance for the cell. These type of values can be used as guidelines for selecting the best conditions for operating a particular Raman cell.

The lens L20 and window W20 shown in FIG. 2 serve multiple purposes as cell windows, lenses and dichroic mirrors in order to achieve a more compact device. However, a combination of elements similar to the arrangement depicted in FIG. 1 could be used in place of those multiple purpose elements. This new geometry for a Raman cell is effective in reducing the length of the cell while avoiding "optical breakdown" at energy levels similar to those for a normal full length cell. However, it has a disadvantage in that the SRS output beam generated by the cell at the usual operating pressures of 1200–1400 PSIG is much smaller in diameter than it would be in a longer cell. This SRS generated beam can, as a result, reach intensities exceeding the damage thresholds for the input and/or output lenses/mirrors. This last-mentioned problem can be solved by reducing the operating pressure of the SRS medium in the cell to a value of between 100–1000 PSIG.

In a Raman cell as depicted in FIG. 1 or 2, the SRS photons are generated either in the direction of propagation of the pump beam, this being called the forward SRS process, or in a direction opposite to that of the pump beam, this being called the backward SRS process. Usually both processes occurs simultaneously. If resonating mirrors are present on both sides of the focal volume the forward and backward generated beams, after reflection, seed and add to the other one. In the cell depicted in FIG. 2, the forward SRS beam is produced in the focal volume toward the lens L20. It is then reflected by the inner reflective coated surface of L20. By reflection the forward SRS beam will be collimated since it is issued in the focal volume of the pump beam which is placed substantially at the focus of the inner surface of L20. The reflected and collimated forward SRS beam then passes through the focal zone of the pump beam. Its central part is at this point preferentially amplified by the backward SRS process. It then exists through the window W20 as a small diameter beam. In a cell having an internal length of 4 cm and containing $CH_4$ at a methane pressure of $\approx 1200$ PSIG, for example, sizeable energy is contained in a diameter less than 0.5 mm. This usually results in a very short lifetime of the inner coatings of window W20. Occasionally damages to the coating on the inner surface of the lens L20 also occur.

There is also a backward SRS beam generated in the focal zone of the pump radiation but toward window W20. This beam mostly exits through W20 as a diverging beam having, at the window W20, about one third of the diameter that the pump beam 22 has at the entrance of the cell. The backward SRS beam will be approximately 5/3 mm in diameter at the window W20, for example, if the pump beam is 5 mm in diameter. This larger beam is much less capable of causing any damage to the optical coatings of W20.

Since the inner surface of W20 is partially reflecting, the backward SRS beam will be partially reflected toward the pump focal zone where it will be amplified and mixed to the forward beam. One can understand at this point that both a forward and a backward beam will occur in a Raman cell as depicted in FIG. 2. The output beam will consist of the contribution of the two processes having a collimated, relatively low divergence and high brightness portion coming from the forward process and a diverging low brightness portion produced by the backward SRS. The ratio of the energy contained in either one of these beams can be varied by varying the pressure of the Raman medium. In a cell having an inner length of 4 cm and containing methane at a pressure of 1200 to 1400 PSIG, for example, the forward beam will strongly dominate. The conversion efficiency is such that about 6 mJ at 1.54 µm are generated when the pump beam energy is 20 mJ. This high SRS energy and small (<0.5 mm) diameter beam will cause optical damages to the inner surfaces of W20 and L20 in a few tens of shots or less. There is, however, a significant reduction of the narrow forward SRS beam and an increase in the energy of the large and expanding backward SRS upon a reduction in the methane pressure to value between 700 and 1000 PSIG. The overall conversion efficiency is also reduced to generate about 3 to 4 mJ. At this point, with that reduction in pressure, the forward and backward SRS beams will no longer cause any damage to the inner surfaces of window W20 and lens L20. The backward SRS beam emitted in this condition can be collimated and expanded by external optical components and still provide sufficient energy for many applications. Other types of gaseous Raman mediums would require different pressures for this mode of operation. A suitable pressure for an $H_2$ medium would, for example, be 150 PSIG.

A further reduction according to of a Raman cell, according to a further embodiment of the present invention, can be achieved by using a combination of cylindrical lenses to produce an astigmatic focal volume in the cell. The article entitled "Generation of High Power 1.54 μm Radiation by Stimulated Raman Scattering in Methane" by F. J. M. Van Putten which was published in Tech. Rep., TNO Physics and Electronics Laboratory in 1990 described such an arrangement of lenses. That same result can, however, be achieved in a simpler way with the use of an aspheric input lens designed to have a stronger longitudinal spherical aberration (LSA) than that given by the convex-concave spherical input lens L20 shown in FIG. 2. That type of aspheric input lens provides the necessary enlargement of the focal volume and a concomitant reduction in the peak intensity of the beam in the cell. A preferred method to achieve the desired increase in the LSA is to grind the outer external surface of lens L20 to a shape having a local curvature that constantly increases from the center of the lens to its periphery. The marginal rays passing through the lens L20 are focused closer to the lens as a result, i.e. closer to L20, than the paraxial rays. One example of such a figure is a section of an oblate spheroid cut perpendicular to the short axis. The use of an aspheric input lens, or a combination of lenses, designed for an increase in LSA produces an elongated focal volume and a resulting lower peak intensity of the beam in that focal volume since the marginal rays reach a focus at a different position than the paraxial rays.

A substantial reduction in a Raman cell's length can be achieved by using a reflection of the focused pump beam in a Raman cell, according to the present invention, as illustrated in FIG. 2. This reduction in length normally would lead to a very small diameter circulating Raman beam which could induce damage to coatings of optical elements in the cell. However, this can be circumvented by a reduction of the pressure of the gaseous Raman medium in the cell to enhance the generation of the backward SRS over the forward SRS process to produce a beam which is highly divergent and which has a sufficiently large diameter on optical surfaces of the cell to prevent any damage.

A further advantage of a Raman cell arrangement according to the present invention is that the positive feedback provided by the reflecting surfaces of the cell is more efficient in a short cell since the round-trip travelling time of the waves from the pump focus to the reflecting surfaces and back to the pump focus is proportional to the cell length. This has the effect of substantially reducing the buildup time of the Raman pulse and thereby increasing the conversion efficiency.

Various modifications may be made to the preferred embodiments without departing from the spirit and scope of the invention as defined in the appended claims.

The embodiments of the invention in which an exclusive property or privilege is claimed are defined as follows:

1. A Raman cell comprising an enclosed cell containing a gaseous Raman medium at a pressure of 100 to 1000 PSIG with an input window for a pump beam at one end of the cell and an output window for a Raman shifted wavelength at an opposite end of the cell, the output window being a plane mirror having an inner face coated with dielectric thin films that provide a high reflectivity at the pump beam's wavelength and a partial reflectivity at the cell's Raman shifted wavelength; the input window containing at least one lens to form a converging lens for the pump beam, the converging lens having a focal length in the Raman medium of about ½ of the cell's inner length to substantially focus the pump beam at the center of the cell after being reflected by the inner face, the inner surface of the lens being coated with dielectric thin films to provide a coating that is highly transmissive to the pump beam but highly reflective at the Raman shifted wavelength.

2. A Raman cell as defined in claim 1, wherein a laser cavity formed by the inner surface of the converging lens and inner face of the plane mirror is hemi-concentric.

3. A Raman cell as defined in claim 1, wherein the inner surface of the converging lens has a radius of curvature substantially equal to the inside length of the cell.

4. A Raman cell as defined in claim 3, wherein the converging lens is formed by a single lens with an external surface having a local curvature that constantly increases from the center of the lens to it's periphery.

5. A Raman cell as defined in claim 4, wherein the external surface of the converging lens is anti-reflection coated for the pump beam's wavelength.

6. A Raman cell as defined in claim 5, wherein the Raman medium is selected from the group $H_2$, $D_2$, $O_2$, $N_2$, $NH_3$, $SO_2$ and $CH_4$.

7. A Raman cell as defined in claim 6, wherein the Raman medium is $CH_4$ at a pressure of 700 to 1000 PSIG.

8. A Raman cell as defined in claim 4, wherein the inner face of the plane mirror has a reflectivity at the Raman shifted wavelength of 5% to 50%.

9. A Raman cell as defined in claim 8, wherein the Raman medium is selected from the group $H_2$, $D_2$, $O_2$, $N_2$, $NH_3$, $SO_2$ and $CH_4$.

10. A Raman cell as defined in claim 9, wherein the Raman medium is $CH_4$.

11. A Raman cell as defined in claim 3, wherein the inner face of the plane mirror has a reflectivity at the Raman shifted wavelength of 5% to 50%.

12. A Raman cell as defined in claim 11, wherein the external surface of the converging lens is anti-reflection coated for the pump beam's wavelength.

13. A Raman cell as defined in claim 12, wherein the Raman medium is selected from the group $H_2$, $D_{21}$, $O_2$, $N_2$, $NH_{31}$ $SO_2$ and $CH_4$.

14. A Raman cell as defined in claim 13, wherein the Raman medium is $CH_4$.

15. A Raman cell as defined in claim 1, wherein the inner face of the plane mirror has a reflectivity at the Raman shifted wavelength of 5% to 50%.

16. A Raman cell as defined in claim 15, wherein the inner face of the plane mirror has a reflectivity at the Raman shifted wavelength of 20% to 50% for a cell that operates in a Raman laser mode at low pump beam power.

17. A Raman cell as defined in claim 5, wherein the inner face of the plane mirror has a reflectivity at the Raman shifted wavelength of 5% to 20% for a cell that operates with a high Raman gain.

* * * * *